United States Patent [19]
Wilson et al.

[11] 3,748,565
[45] July 24, 1973

[54] PREDICTIVE POSITION FEEDBACK CONTROLLER FOR WEB GUIDE CONTROL SYSTEM

[75] Inventors: Francis B. Wilson, Wauconda; Mathew E. Rodenkirch, Chicago, both of Ill.

[73] Assignee: The Singer Company, New York, N.Y.

[22] Filed: Oct. 22, 1971

[21] Appl. No.: 191,677

[52] U.S. Cl. .............................. 318/609, 318/621
[51] Int. Cl. ........................................ G05b 11/36
[58] Field of Search .................... 318/609, 610, 621

[56] References Cited
UNITED STATES PATENTS

| | | | |
|---|---|---|---|
| 3,675,050 | 7/1972 | Paul | 307/304 |
| 3,227,935 | 1/1966 | Kawada | 318/610 |
| 2,668,264 | 2/1954 | William, Jr. | 318/610 X |
| 3,510,737 | 5/1970 | Brown et al. | 318/621 X |
| 3,613,419 | 10/1971 | Silva | 318/621 X |

*Primary Examiner*—T. E. Lynch
*Attorney*—Julian Falk, Lloyd L. Zickert et al.

[57] ABSTRACT

An electronic controller for a process control system for use with a bi-directional single speed actuating device wherein the controller includes a proportional plus integral mode with predictive position feedback.

13 Claims, 8 Drawing Figures

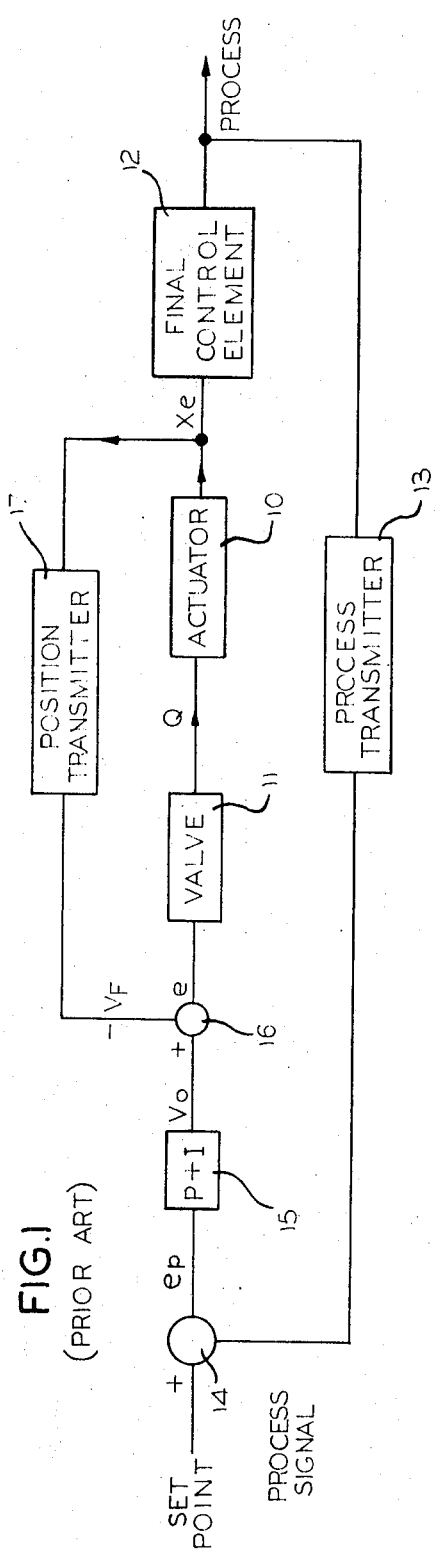
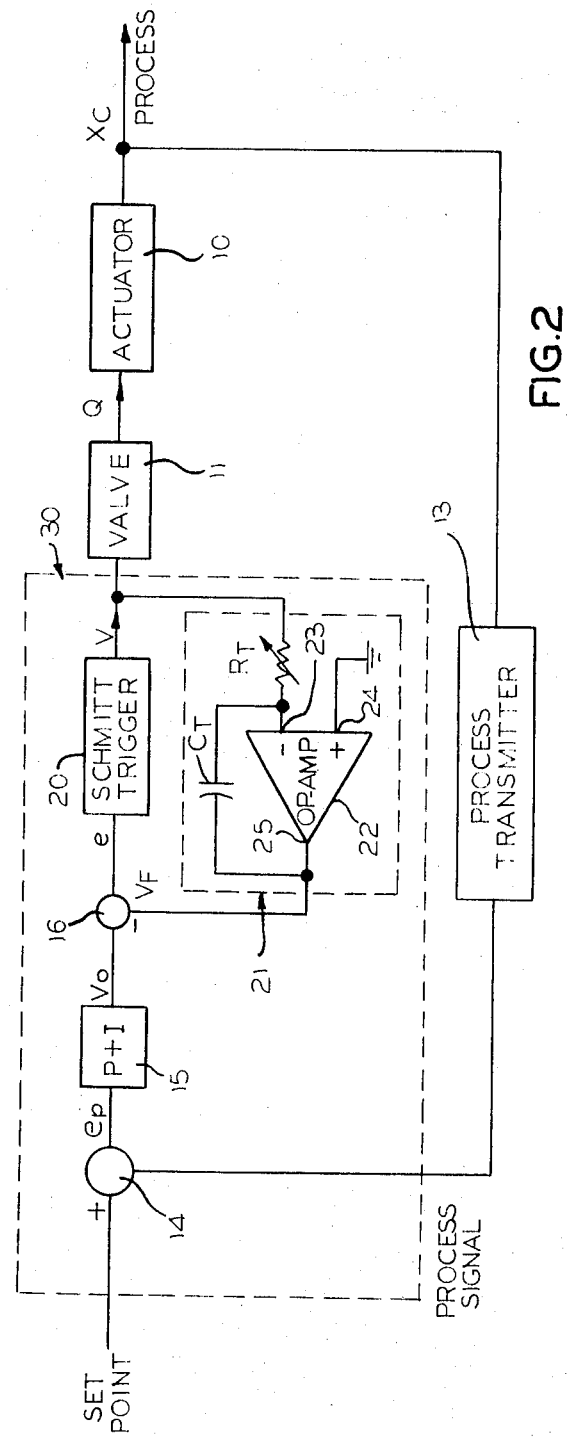
INVENTORS
FRANCIS B. WILSON
MATHEW E. RODENKIRCH
BY
Kinzer, Dorn & Zickert
ATTORNEYS

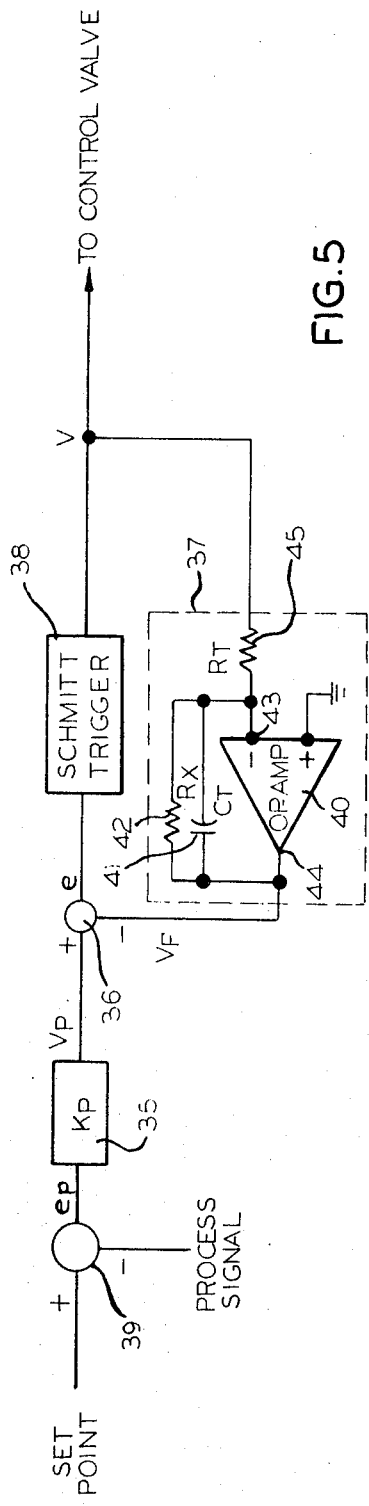
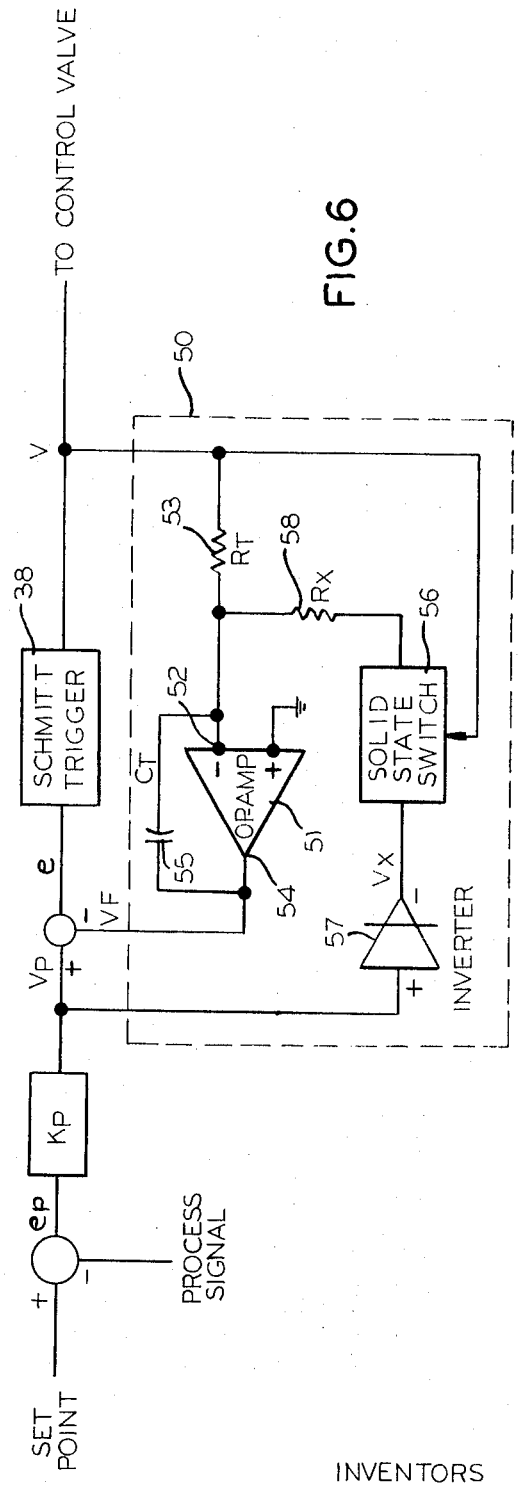

PREDICTIVE POSITION FEEDBACK CONTROLLER FOR WEB GUIDE CONTROL SYSTEM

This invention relates in general to a control system for maintaining a process variable within parameters of a predetermined set point, and more particularly to an electronic process controller to perform a stabilizing control function, and still more particularly to a controller for proportionally positioning a manipulated variable in response to an electric input signal, where the manipulated variable may be a hydraulic cylinder or a reversible electric motor.

Process output is detected by a sensor which generates a signal for a controller that drives an actuator to control said process. In an integral or reset mode control, the speed of the manipulated variable is proportional to the error signal. Therefore, in slow processes, such as where there is a time lag between the value of the control variable and the position of the manipulated variable, the integral mode control usually results in instability. To overcome this problem and accomplish stability, it is common to use proportional mode control or proportional mode plus integral mode control. An integral mode controller can be made to function as a proportional mode controller by adding position feedback, this usually being in the form of a position transmitter located at the control cylinder. Such position feedback arrangements require relatively complex and costly hardware.

The present invention converts the proportional floating or single speed floating controller to a positioner without the use of a position transmitter, thereby eliminating hardware, and at the same time reducing costs. Moreover, the actuator portion of the controller is isolated from the control portion, contrary to previous devices. The invention may be applied to a wide range of control systems such as non-self regulating types, or where the dynamics indicate the need for proportional plus integral type control.

The electronic controller of this invention constitutes a proportional plus integral mode controller with predictive position feedback capable of performing a stabilizing control function in a process control system which is basically proportional plus integral in nature, but does not include actual position feedback. It is useful with a bi-directional single speed actuating device such as a four-way directional control valve-cylinder combination or a reversible single speed electric motor.

It is therefore an object of the present invention to provide a new and improved electronic controller for a process control system, which is capable of performing a stabilizing control function.

Another object of this invention is in the provision of a controller for a process control system that includes proportional and integral modes with predictive position feedback which eliminates the positive position feedback, and thereby reduces the hardware and controls needed to provide stability.

A still further object of this invention is in the provision of an electronic controller for process control systems which provides a positioner control without the use of a position transmitter responding to the control cylinder, and which isolates the actuator from the control portion of the system.

Other objects, features and advantages of the invention will be apparent from the following detailed disclosure, taken in conjunction with the accompanying sheets of drawings, wherein like reference numerals refer to like parts, in which:

FIG. 1 is a block diagram showing a conventional process control loop with true valve position feedback;

FIG. 2 is a combination block and schematic diagram of a process control loop according to the present invention which includes predictive position feedback of the valve;

FIG. 5 is a combination diagrammatic and schematic view of a modified process control loop illustrating a simpler version than that of FIG. 2 wherein the reset action is obtained by discharge action of a resistor in the feedback loop;

FIG. 6 is a combination diagrammatic and schematic diagram illustrating a further modification of the invention where the reset action is generated by the feedback integrator, but with complete isolation of stroking time and reset actions;

Figure 7:
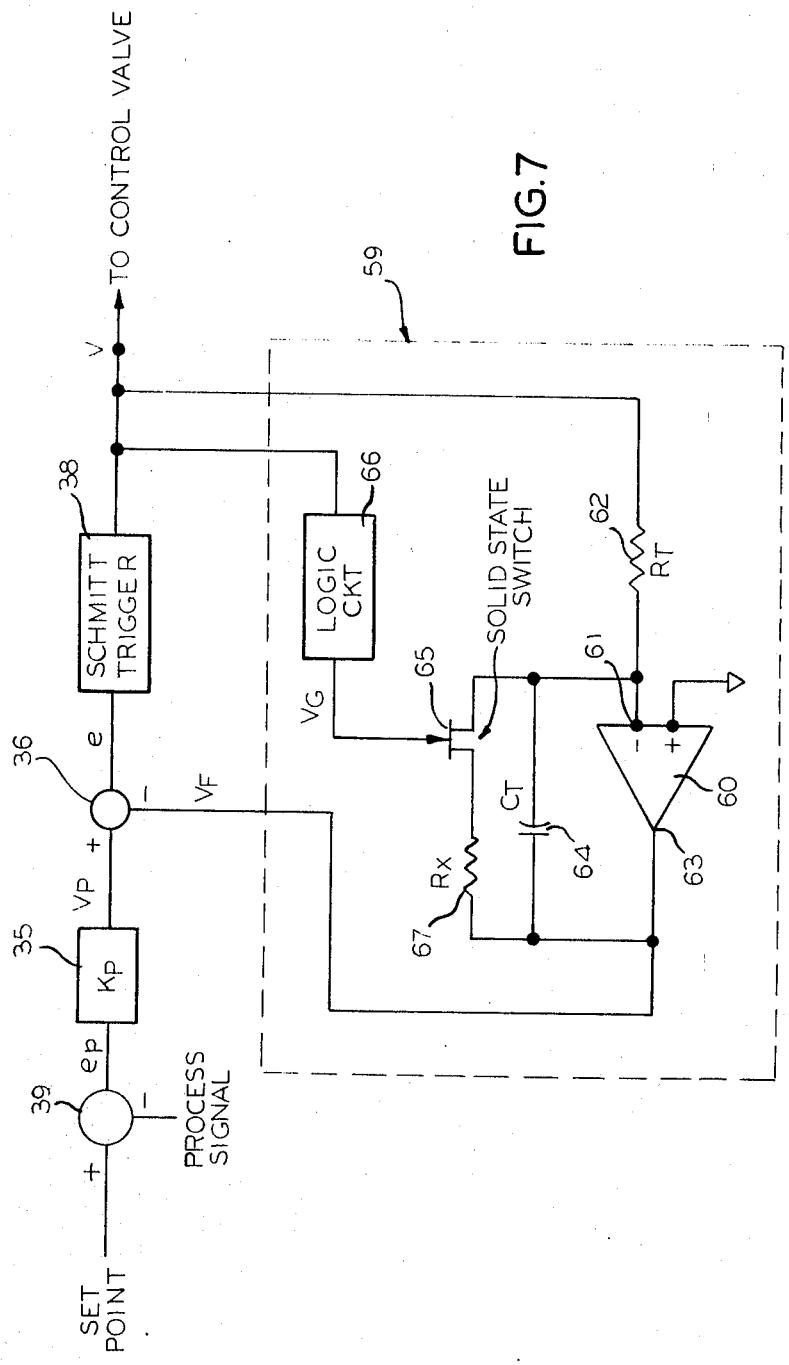
Figure 8:
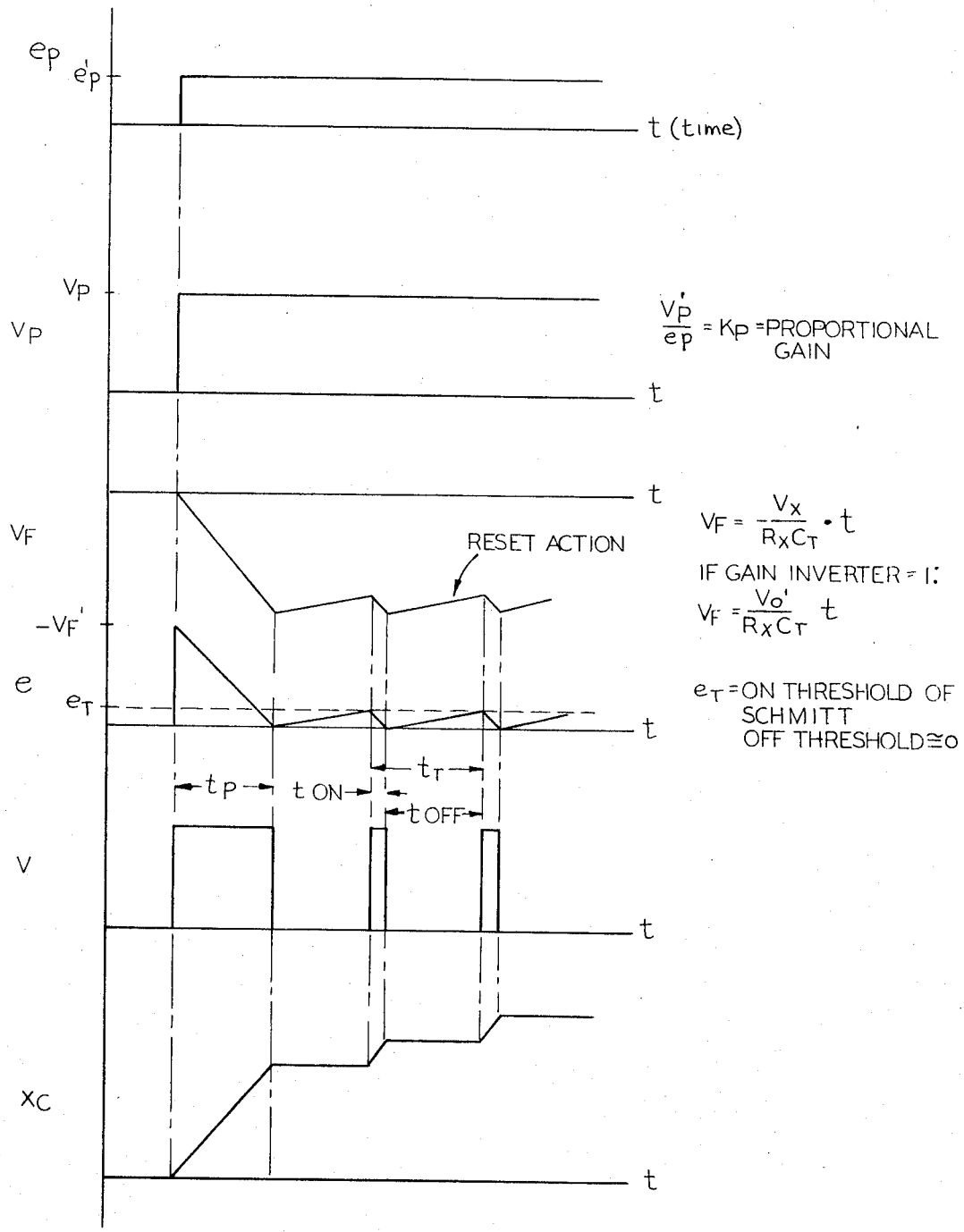

FIG. 7 is a combination diagrammatic and schematic diagram illustrating a further modification of the invention where the reset action is obtained by discharge action of a resistor in the feedback loop, but with complete isolation of stroking time and reset actions; and FIG. 8 is a timing diagram illustrating the overall control action of the circuits shown in FIGS. 6 or 7 under constant process error.

The present invention is best understood by referring to the prior art, as illustrated in FIG. 1, wherein a conventional process control loop is illustrated. The actuator 10 is driven by a conventional valve 11 and together comprise a conventional four-way directional control valve-cylinder combination which will produce a bi-directional single speed operation. Alternatively, a reversible electric motor could be provided, or any other type of electric signal responsive bi-directional single speed actuating device. The final control element 12, such as a control valve, louvre, steering rool, etc. is controlled as to position by the actuator 10 for the processes of the system. At a desired control point, the process is sensed by a suitable sensor which produces through a process transmitter 13 a process signal voltage which is delivered to a summing junction 14. A set point voltage is also fed to the summing junction 14 from which a process error signal ($e_p$) is produced and delivered to a proportional plus integral (P+I) mode controller 15. The controller 15 amplifies the signal and produces a controller output voltage ($V_o$) which is delivered to a second summing junction 16. The process signal will be the opposite polarity of the set point signal and when it differs from the set point signal a process error signal will be produced out of the summing junction 14 calling for correction of the process variable. A feedback voltage ($V_F$) is produced from a suitable device at the actuator 10 and transmitted by the position transmitter 17 to the summing junction 16, it being appreciated that the feedback voltage changes as the position of the actuator changes and coacts with the output voltage ($V_o$) to produce an error voltage ($e$) for driving the valve 11. The actuator position (($X_c$) is therefore directly ascertained, and follows the controller output ($V_o$). The valve 11 is usually of the "on-off" type and it is therefore necessary to add a dead zone to stabilize the inner loop. Where the actuator 10 is of an integrating type, such as a hydraulic cylinder or electric motor, the actuator will move at full speed whenever the error exceeds the dead zone. It is this type of actuator that is utilized in the controller of the present invention wherein the change in actuator position can be inferred from the time the output voltage is "on."

The controller of the present invention in one embodiment, as illustrated in FIG. 2, differs from the prior art shown in FIG. 1 in that the true position of the actuator is not actually sensed and used for producing a feedback voltage, but a feedback voltage is produced from an electrical integrator driven by the same voltage (V) that operates the valve 11. The elements in FIG. 2 that are identical to those shown in FIG. 1 are identified by the same numerals. The signal voltage ($e$) from the summing junction 16 is fed to a Schmitt trigger 20, well known as a hysteretic switching device, which when triggerd applies voltage to the valve 11 to drive the actuator at full speed in one direction. The integrator 21 is driven by the same voltage (V) that operates the valve 11 to produce a feedback voltage ($V_f$) of opposite sign to the output voltage ($V_o$) which starts at zero and increases linearly to sum out one hundred percent of $V_o$ at the summing junction 16 when equal to the full stroking time of the actuator. When $V_f$ equals $V_o$, the Schmitt trigger 20 will close dropping V to zero and thereby stopping the actuator. Accordingly, the output V is timed to be "on" in proportion to the signal $V_o$, whereby the position $X_c$ of the actuator will be proportional to $V_o$.

The integrator 21 includes a high gain operational amplifier 22 having inputs 23 and 24 and an output 25. The input 23 is connected through a variable timing resistor ($R_T$) to the voltage signal V, while the input 24 is connected to ground. A timing capacitor $C_T$ is connected across the common of the input 23 and resistor $R_T$ and the output 25. The integrator timing is adjusted by varying the value of the resistor $R_T$. By properly scaling the integrator, the time it takes the feedback voltage $V_f$ to sum out 100%, the output voltage $V_o$ can be made equal to the full stroking time of the actuator.

Figure 3:
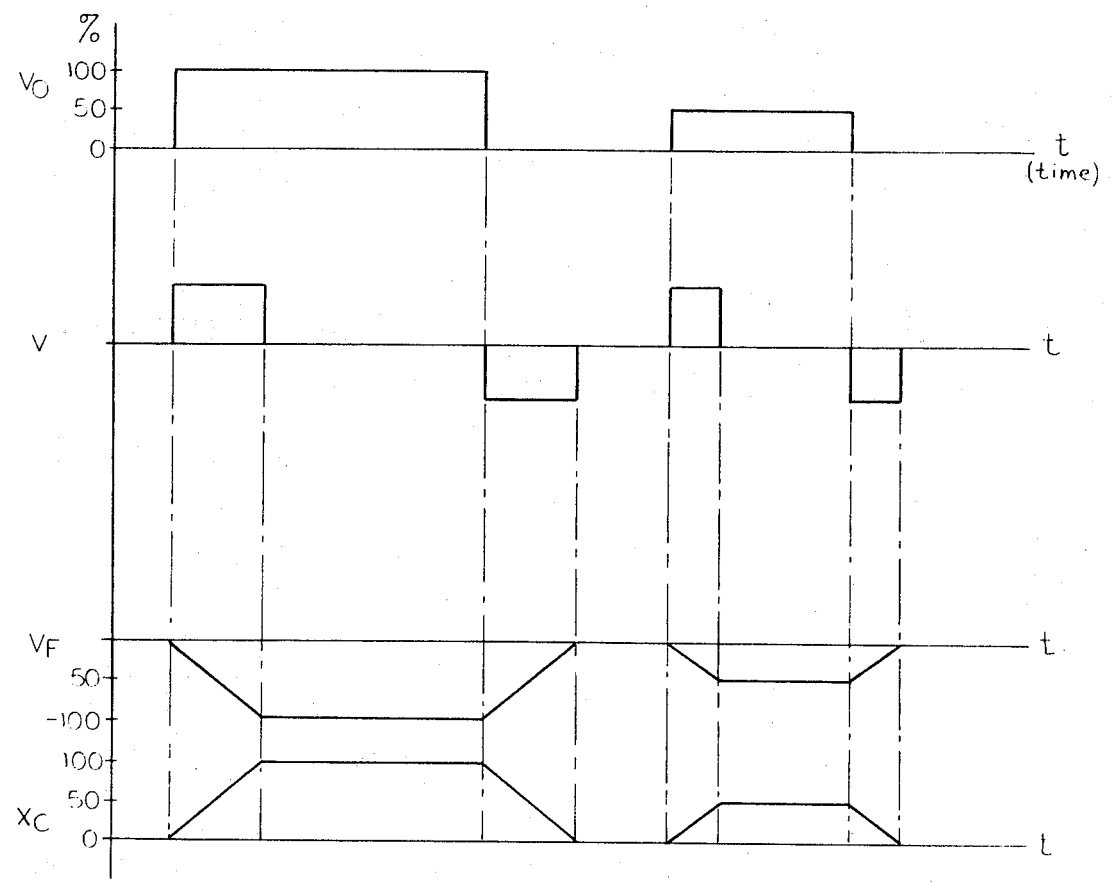
FIG. 3 is a timing diagram illustrating the proportional action of the actuator in accordance with the process control loop of FIG. 2.

The proportional stroking action of the actuator is shown in FIG. 3 where for simplicity sake the triggering level of the Schmitt trigger occurs at zero level. However, the triggering level of the Schmitt trigger is much smaller than the output voltage $V_o$ so that the output voltage is available for the timing action of the integrator. The controller integration time is set for the full range of the signal $V_o$ equal to the full stroking time of the cylinder.

Figure 4:
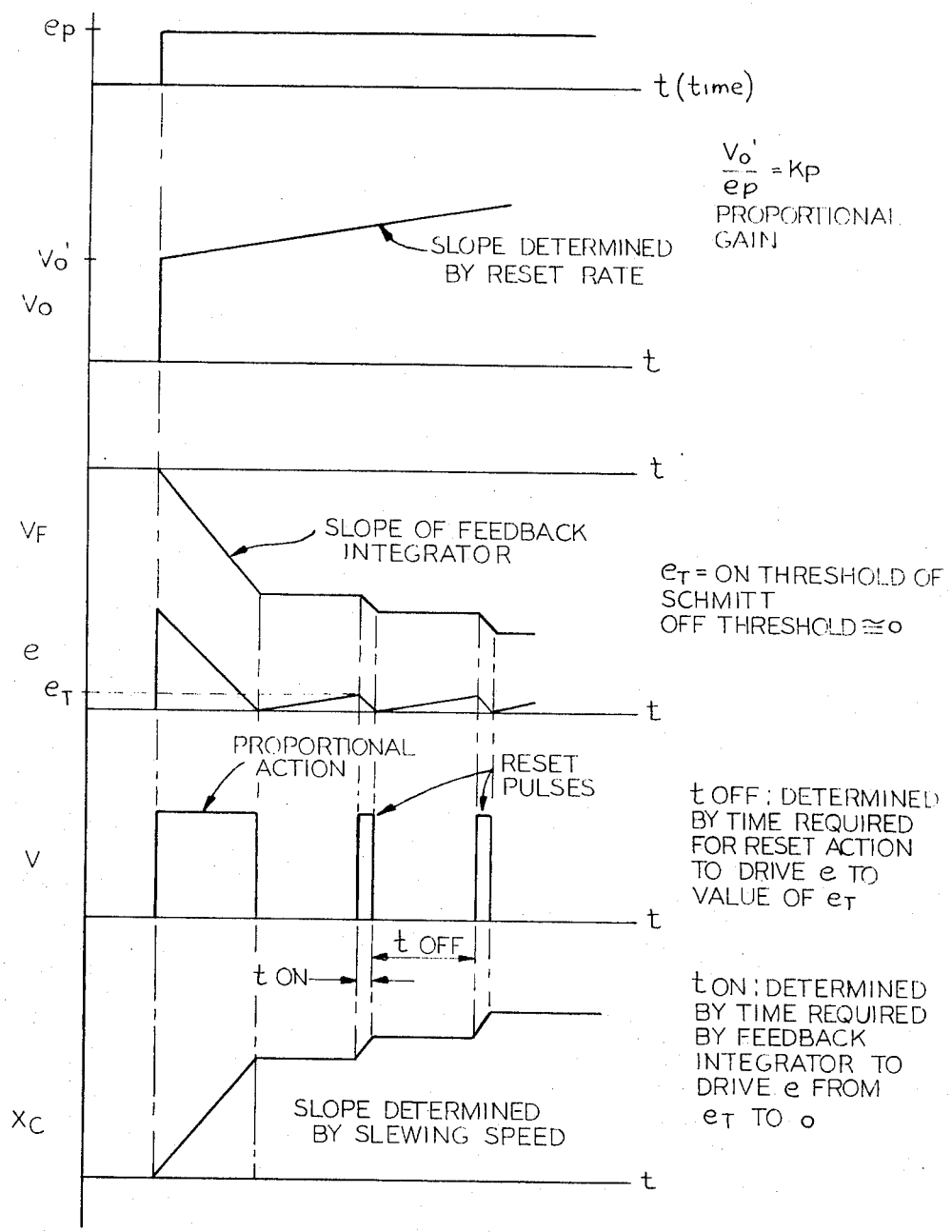
FIG. 4 is a timing diagram illustrating the nature of the output of the controller in FIG. 2 with constant process error.

In FIG. 2, the controller is generally designated by the numeral 30 which includes the proportional plus integral mode (P+I) 15 and the integrator 21. Where constant process error $e_p$ is present, the nature of the output of the controller is illustrated in FIG. 4. Here it is seen that the action is a long output pulse V defining proportional action followed by a series of pulses defining reset pulses, the latter of which is produced by the P+I mode 15. The "on" time of the reset pulses will be a fixed percentage of the full scale stroking time of the actuator, while the time between pulses or the frequency of the pulses will vary with the signal level. The reset action results in a jogging action of the actuator.

A similar version of the controller according to the invention is illustrated in FIG. 5, wherein the rest action is obtained by a discharge action of a resistor in the integrator. In this version the process error signal $e_p$ is delivered to a proportional amplifier 35 which may be a conventional analog amplifier to amplify the process error signal and feed it to a summing junction 36. A feedback voltage $V_f$ is also fed to the summing junction 36 and is produced by an integrator 37 driven by the same voltage V which goes to the control valve of the actuator. Accordingly, the summing junction 36 compares the amplifier process error signal $V_p$ and the feedback signal $V_f$ to deliver a voltage signal e to the Schmitt trigger 38. The process error signal $e_p$ is derived from the summing junction 39 which compares the process signal with the set point voltage.

The integrator 37 and the feedback loop includes an operational amplifier 40 have a capacitor 41 ($C_T$) and a resistor 42 ($R_X$) connected in parallel and across the input 43 and the output 44. A resistor 45 ($R_T$) is is connected to the common of the input 43, the capacitor 41 and the resistor 42. A reset action is obtained from the discharge action of resistor 42. This controller has the advantage in that the amplifier output $V_p$ will not "wind-up" under constant process error $e_p$. The value of resistor 45 is less than the value of resistor 42 to thereby prevent interaction between the stroking time and the reset rate adjustment.

Further versions of the controller according to the invention are illustrated in FIG. 6 and FIG. 7 wherein the reset action is generated by the feedback integrator (FIG. 6) or by capacitor discharge (FIG. 7), and where complete isolation of the actuator stroking time and reset actions is obtained. Identical elements in this version to those in the version of FIG. 5 are indicated by the same numerals. Reset pulses can be generated even if the output of the amplifier 35 ($K_p$) is saturated, as is the case with the version of FIG. 5. Therefore, even if the stroking time adjustment is set lower than actual cylinder stroking time, the reset action will eventually drive the cylinder to the required position to reduce the error.

The integrator in the version of FIG. 6 designated by the numeral 50 includes an operational amplifier 51 having an input 52 connected to the voltage V through the timing resistor 53 ($R_T$). The output 54 is connected to the summing junction 36, and the timing capacitor 55 ($C_T$) is connected across the input 52 and the output 54. A solid state switch 56 is open when the voltage V is "on" (+ or −) and closed when the voltage equals zero, and therefore the switch 56 is controlled by the voltage V. When the switch 56 is closed an inverter 57 driven by the output of the amplifier 35 applies an inverted voltage signal ($V_x$) to the resistor 58 ($R_X$) which is connected in common to the input 52 of the operational amplifier 51, the timing resistor 53 and the timing capacitor 55. Accordingly, the reset adjustment of resistor 58 will not affect stroking time. This version, like that illustrated in FIG. 5, also avoids reset windup of the amplifier 35 output under constant process error.

The integrator in the version of FIG. 7 designated by the numeral 59 includes an operational amplifier 60 having an input 61 connected to the voltage V through the timing resistor 62 ($R_T$). The output 63 is connected to the summing junction 36, and the timing capacitor 64 ($C_T$) is connected across the input 61 and the output 63. Reset resistance 67 ($R_X$) in series with solid state switch 65 are connected across timing capacitor 64 ($C_T$). Solid state switch 65 is open when voltage V is "on" (+ or −) and closed when the voltage V is zero. Switch 65 is gated on or off thru logic circuit 66. When the switch 65 is closed capacitor 64 ($C_T$) is discharged, dropping $V_F$ until e equals the Schmitt threshold, thereby releasing a reset pulse. Accordingly the reset adjustment of resistor 67 will not affect stroking time. This version also avoids reset windup of the amplifier 35 output under constant process error. The voltage output of the logic circuit, $V_G$, is − whenever the output V is "on" (+ or −); and + whenever the output V is zero, and the switch 65 is closed.

The overall control action of the versions in FIG. 6 and FIG. 7 under constant process error is shown in FIG. 8. While the final output actions of the voltage V and the position of the actuator $X_c$ are identical to that of the version of FIG. 2, as shown in FIG. 4, the reset pulses are generated by driving the feedback voltage $V_f$ back down until the voltage signal e to the Schmitt trigger equals the "on" threshold voltage $e_t$. During this action, the output voltage signal ($V_p$) of the amplifier 35 remains constant and equal to the constant process error voltage ($e_p k_p$) and the feedback voltage $V_f$ varies between $-V_f'$ (output off) and $-V_f'$ plus the threshold voltage ($e_t$) (output on) of the Schmitt trigger. When the output voltage V comes on it drives the feedback voltage $V_f$ toward minus $V_f'$ at the maximum rate pursuant to the formula $V_f = V/R_T C_T \times t$. When the output is off, the reset action drives the feedback voltage $V_f$ down until the error voltage (e) equals the threshold voltage ($e_t$) of the Schmitt trigger and at the rate $V_f = V/R_X C_T \times t$. The variable voltage output $V_p$ of the proportional amplifier 35 is such that the "off" time of the Schmitt trigger varies in relation to this output level. Therefore, the greater the output voltage $V_p$, the greater will be the frequency of the reset pulses and the overall control action will approximate that of a true proportional plus integral controller.

The final output voltage V to the control valve is three-state "on-off" so that typical output state conditions would be a full positive voltage where the cylinder is moving in one direction, a full negative voltage where the cylinder is moving in the opposite direction, and a zero voltage where the cylinder is stopped. Further, the output of the proportional amplifier 35 is a bidirectional (±) proportional signal to act in accordance with the process error signal (±). The integrator feedback voltage $V_f$ is likewise ± and always opposite in sign to the output voltage signal $V_p$ of the proportional amplifier. During the proportional pulsing the integrator voltage $V_f$ sums out the change in the proportional amplifier $V_p$. The value of the timing resistor 53 ($R_T$) can be adjusted to vary this rate to match cylinder speeds. By properly scaling the timing resistor 53, the time required to sum out 100% of the amplifier voltage output can be equal to the time it takes the cylinder to go full stroke. Therefore, the action of the controller is that of a true positioner wherein 100% change in the output voltage results in 100% change in cylinder position, or 50% change in output voltage results in 50% change in cylinder position, etc.

Accordingly, the controller where it provides a predictive position feedback defines a proportional plus integral control action using an on-off valve or electric motor without the need of a position transmitter.

It will be understood that modifications and variations may be effected without departing from the scope of the novel concepts of the present invention, but it is understood that this application is to be limited only by the scope of the appended claims.

The invention is hereby claimed as follows:

1. In an apparatus for process control including an electric signal responsive bidirectional single speed actuating device for controlling the position of a manipulated variable, means for sensing the process at a control point and for producing a process signal, and an electronic controller receiving said signal and controlling a timed voltage for driving the actuating device, the improvement being in the controller which comprises amplifying means receiving an error signal produced by comparing the process signal and a set point signal and amplifying same to produce an amplified output signal, a hysteretic switching device between the amplifying means and the actuating device triggered by the amplified output signal and controlling a voltage for the actuating device, and an integrator producing a feedback signal opposite to said output signal and having its input connected to the input voltage to the actuating device and its output summed with said output signal to produce a summed signal to time the summed signal to be on in proportion to the output signal wherein the position of the actuating device will be proportional to the output signal.

2. The controller of claim 1, wherein the integrator includes an operational amplifier having an input connected to the actuating device voltage and an output connected to a summing junction with the amplified output signal, a timing capacitor connected across said output and said input of the operational amplifier, and a timing resistor connected between said input and the actuating device voltage, wherein adjustment of the resistor adjusts the timing of the integrator.

3. The controller of claim 2, wherein the resistor is variable to adjust the timing of the integrator.

4. The controller of claim 1, and means for providing reset action in response to constant process error.

5. The controller of claim 4, wherein said reset action means includes an integral mode combined with said proportional amplifier.

6. The controller of claim 2, and means for providing reset action in response to constant process error.

7. The controller of claim 6, wherein said reset action means includes a resistor connected in the integrator in parallel with the timing capacitor which discharges to provide the reset action.

8. The controller of claim 6, wherein said reset action means includes a reset circuit consisting of a resistor connected in the integrator in series with an inverter between the amplified output signal and the input of the operational amplifier, and switch means responsive to the actuating device voltage to turn the circuit off when the actuating device voltage is on and to turn the circuit on when the actuating device voltage is off.

9. The controller of claim 6, wherein said reset action means includes a reset circuit consisting of a series combination of a resistor and a solid state switch connected in the integrator in parallel with the timing capacitor, said switch responsive to the actuating device voltage to turn the circuit off when the actuating device voltage is on and to turn the circuit on when the actuating device voltage is off.

10. In an apparatus for controlling a process variable including an electric signal responsive bi-directional single speed actuating device for controlling a manipulated variable, means for sensing the process at a control point and for producing a process signal, and an electronic controller receiving said signal and controlling a timed voltage for driving the actuating device, the improvement being in the controller which comprises a proportional plus integral mode receiving an error signal produced by comparing the process signal and a set point signal and amplifying same to produce an amplified output signal and producing reset action, a hysteretic switching device between the proportional plus integral mode and the actuating device triggered by the amplified output signal and controlling a voltage for the actuating, device, and an integrator producing a feedback signal opposite to said output signal and having its input connected to the input voltage to the actuating device and its output summed with said output signal to produce a summed signal to time the summed signal to be on in proportion to the output signal wherein the position of the actuating device will be proportional to the output signal.

11. The controller of claim 10, wherein the integrator includes an operational amplifier having an input connected to the actuating device voltage and an output connected to a summing junction with the amplified output signal, a timing capacitor connected across the output and the input of the operational amplifier, and a timing resistor connected between the operational amplifier input and the actuating device voltage, wherein adjustment of the resistor adjusts the timing of the integrator.

12. The controller of claim 11, wherein the resistor is variable to adjust the timing of the integrator.

13. In an apparatus for process control including an electric signal responsive bi-directional single speed actuating device for controlling the position of a manipulated variable, means for sensing the process at a control point and for producing a process signal, means for producing a set point signal, and an electronic controller receiving and comparing the process and set point signals to produce an error signal which controls a timed voltage for driving the actuating device, the improvement being in the controller which comprises a hysteretic switching device receiving and triggered by the error signal and controlling a driving voltage for the actuating device, and an integrator producing a feedback signal opposite to said error signal having its input connected to the driving voltage of the actuating device and its output summed with the error signal to produce a summed signal to maintain said driving voltage on in proportion to said error signal, wherein the position of the actuating device will be proportional to said error signal.

* * * * *